US012153211B2

(12) United States Patent
Stratton et al.

(10) Patent No.: US 12,153,211 B2
(45) Date of Patent: Nov. 26, 2024

(54) DUAL SIDED EXPANSION WAVEGUIDE

(71) Applicant: Rockwell Collins, Inc., Cedar Rapids, IA (US)

(72) Inventors: Eric P. Stratton, Portland, OR (US); Robert D. Brown, Lake Oswego, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 267 days.

(21) Appl. No.: 17/850,592

(22) Filed: Jun. 27, 2022

(65) Prior Publication Data

US 2023/0417976 A1 Dec. 28, 2023

(51) Int. Cl.
*G02B 27/00* (2006.01)
*F21V 8/00* (2006.01)
*G02B 5/18* (2006.01)
*G02B 27/01* (2006.01)
(Continued)

(52) U.S. Cl.
CPC ....... *G02B 27/0081* (2013.01); *G02B 5/1823* (2013.01); *G02B 5/1866* (2013.01); *G02B 6/005* (2013.01); *G02B 27/0101* (2013.01); *G02B 27/0172* (2013.01); *G02B 2005/1804* (2013.01); *G02B 6/0026* (2013.01); *G02B 2027/0125* (2013.01); *G02B 27/126* (2013.01); *G02B 27/30* (2013.01)

(58) Field of Classification Search
CPC .. G02B 27/0081; G02B 6/0026; G02B 6/005; G02B 5/1866; G02B 27/126; G02B 27/30; G02B 2005/1804
See application file for complete search history.

(56) References Cited

U.S. PATENT DOCUMENTS 9,557,458 B2 1/2017 Lutolf et al.
10,795,160 B1 10/2020 Stanley et al.
10,983,263 B2 4/2021 Kleinman et al.
(Continued)

FOREIGN PATENT DOCUMENTS

CN 214474235 U 10/2021
WO 2021098742 A1 5/2021

OTHER PUBLICATIONS

Bernard C. Kress, "Optical waveguide combiners for AR headsets: features and limitations", Spie Proceedings, vol. 11062, Jul. 16, 2019, pp. 110620J-11060J.
(Continued)

*Primary Examiner* — Michelle R Connelly
*Assistant Examiner* — Kirsten D. Endresen
(74) *Attorney, Agent, or Firm* — Suiter Swantz IP

(57) ABSTRACT

An optical display includes a waveguide comprising an input coupler, first expansion grating, second expansion grating, and output coupler. The input coupler is configured to couple image light from an image source. The first expansion grating is configured to receive the image light, expand the image light along a first axis and away from a first direction at a first angle of expansion, and direct the image light out of the first expansion grating in a second direction different than the first direction. The second expansion grating is configured to receive the image light, to expand the image light along the first axis and towards the first direction at a second angle of expansion, and direct the image light out of the first expansion grating in the second direction.

20 Claims, 7 Drawing Sheets

(51) Int. Cl.
  *G02B 27/12* (2006.01)
  *G02B 27/30* (2006.01)

(56) References Cited

U.S. PATENT DOCUMENTS

| | | |
|---|---|---|
| 11,281,013 B2 * | 3/2022 | Popovich ............ G02B 27/0179 |
| 11,300,795 B1 | 4/2022 | Stanley et al. |
| 2017/0315346 A1 * | 11/2017 | Tervo .................... G02B 5/1819 |
| 2022/0066204 A1 * | 3/2022 | Pfeiffer .............. G02B 27/4211 |
| 2023/0296883 A1 * | 9/2023 | Jiang .................. G02B 27/0081 |
| | | 385/37 |

OTHER PUBLICATIONS

Extended European Search Report dated Nov. 20, 2023; European Application No. 23179725.9.
Jonathan D. Waldern et al. "Wide field of view multiplexed photopolymer consumer AR displays", SPIE Proceedings; vol. 11310, Feb. 19, 2020, pp. 113100l-113100l.

* cited by examiner

DUAL SIDED EXPANSION WAVEGUIDE

CROSS-REFERENCE TO RELATED APPLICATIONS

The present application hereby incorporates the following applications by reference in their entirety:

U.S. Pat. No. 10,795,160, filed on Sep. 25, 2014, entitled SYSTEMS FOR AND METHODS OF USING FOLD GRATINGS FOR DUAL AXIS EXPANSION, which is herein incorporated by reference in the entirety.

TECHNICAL FIELD

The present disclosure relates to displays including, but not limited to, near eye displays. More specifically, the disclosure relates to substrate guided optics.

BACKGROUND

Single axis expansion waveguides are limited by the size of accompanying projector optics (at least in one direction) while dual axis expansion waveguides are limited by the substrate size and the substrate's grating prescriptions.

Previous techniques for dual axis expansion waveguides were too large and tried accommodating a wide field of view (FOV) by using low index grating material. This drove tightly controlled clocking of gratings and caused the substrate footprint area to grow. Still other concepts such as multiplexed or mushroom forest gratings may build too large of an eyebox, thereby degrading efficiency and uniformity of the perceived image.

SUMMARY

Some embodiments of the present disclosure relate to an optical display includes a waveguide comprising an input coupler, first expansion grating, second expansion grating, and output coupler. The input coupler is configured to couple image light from an image source. The first expansion grating is configured to receive the image light, expand the image light along a first axis and away from a first direction at a first angle of expansion, and direct the image light out of the first expansion grating in a second direction different than the first direction. The second expansion grating is configured to receive the image light, to expand the image light along the first axis and towards the first direction at a second angle of expansion, and direct the image light out of the first expansion grating in the second direction.

Other embodiments relate to a method of displaying image light. The method includes receiving collimated image light from an image source in an input coupler of a waveguide; providing the image light to a beamsplitter via total internal reflection; providing the image light to a first expansion grating and a second expansion grating via total internal reflection; expanding the image light along a first axis away from a first direction at a first angle of expansion using the first expansion grating, and directing the image light out of the first expansion grating in a second direction to an output coupler via total internal reflection, wherein the second direction is different than the first direction; expanding the image light along the first axis towards the first direction at a second angle of expansion using the second expansion grating, and directing the image light out of the second expansion grating in the second direction to the output coupler via total internal reflection; expanding the image light along a second axis using the output coupler; and causing the image light to exit the waveguide in an output direction.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In the drawings.

DETAILED DESCRIPTION

Figure 1A:
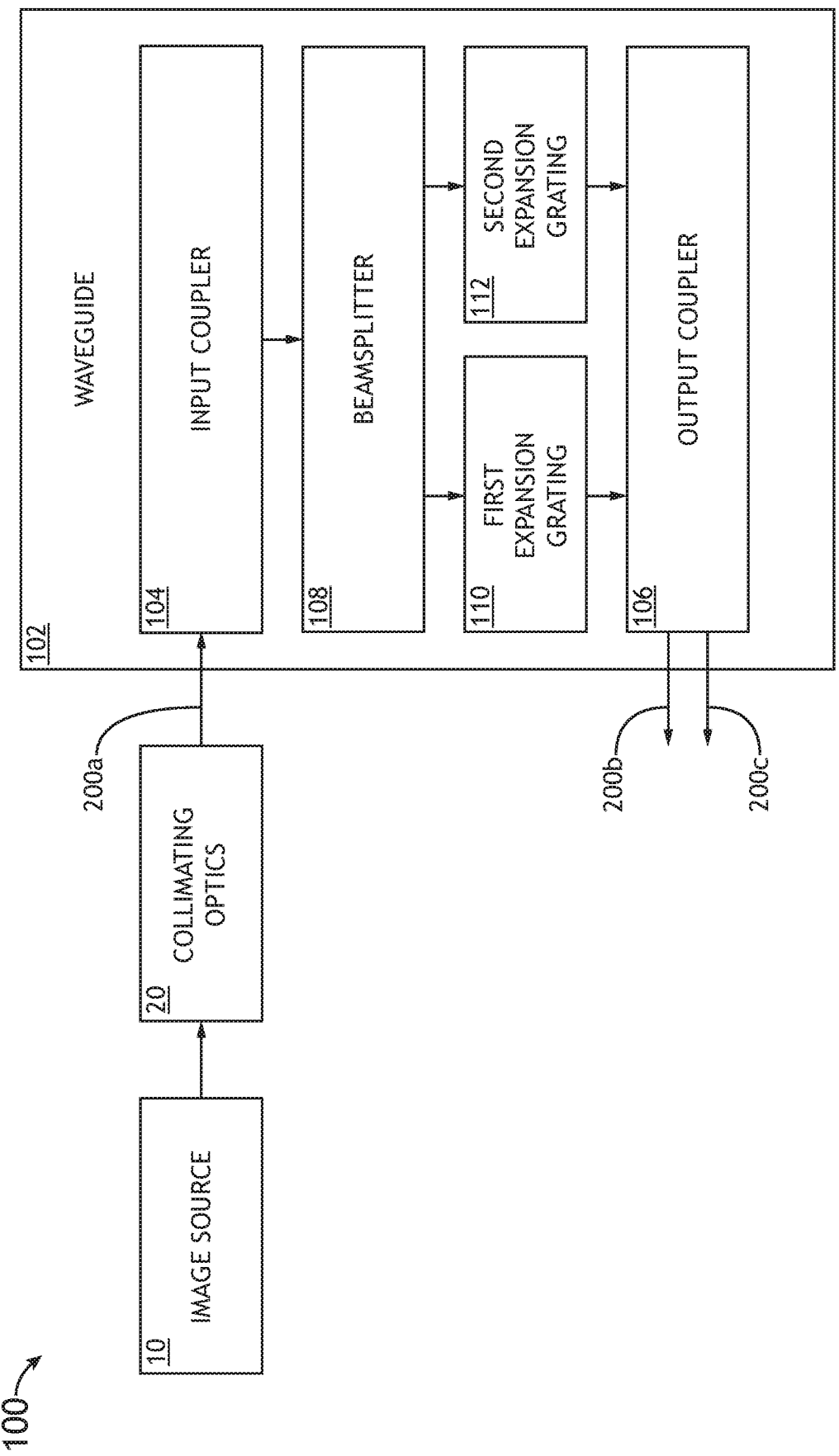
FIG. 1A is a conceptual diagram of an optical display, according to an exemplary embodiment.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Broadly speaking, embodiments of the inventive concepts disclosed herein are directed to optical displays utilizing waveguides with dual sided expansion gratings. Using the systems and methods disclosed herein, a single waveguide having higher efficiency and/or more compact waveguide sizes than found in current waveguide systems may be provided for. In some embodiments, the dual sided expansion is provided for by overlapping the expansion gratings. In some embodiments, a grating period of each expansion grating is self-reciprocal in order to both expand the image light along a first axis and then redirect the image toward the output coupler. Such embodiments may allow for reducing the space of the waveguide needed to expand the image light (i.e., create a larger eyebox). For example, in some embodiments, due to being overlapped together, the expansion gratings allow for the benefit of maintaining a net zero k-vector deviation for little to zero dispersion of the image light. Moreover, a grating period of the input coupler being equal to the grating period of the output coupler may provide for an elimination of dispersion of the image light.

One method for dispersing light utilizes diffraction gratings. Diffraction gratings are used to split and diffract light rays into several beams that travel in different directions, thereby dispersing the light rays. Generally, a larger pupil (i.e., eyebox, area that an image may be viewed from) of an output image may be created by using expansion gratings in conjunction with conventional or other gratings to provide pupil expansion on a single waveguide in both the horizontal and vertical directions, thereby enabling the use of a smaller lens system. Using input/output couplers and gratings for dual axis expansion is generally described in U.S. Pat. No. 10,795,160, filed on Sep. 25, 2014, entitled SYSTEMS FOR AND METHODS OF USING FOLD GRATINGS FOR DUAL AXIS EXPANSION, which is herein incorporated by reference in the entirety.

Further, some methods for dispersing light are relatively expensive because they require multiple elements (e.g., gratings) and other optical components to achieve the expansion of an eyebox.

At least some of the embodiments herein address the challenges above. Note that, in at least some embodiments, dual-axis expansion may mean expanding the pupil of an output image in the horizontal and vertical directions, while dual sided expansion may mean utilizing two or more expansion gratings (e.g., overlapping gratings, facing each other) to expand light along at least a first axis (e.g., horizontal axis). In some embodiments, expansion along a first axis/direction is a horizontal expansion and is performed via first and second expansion gratings, and expansion along a second axis/direction is a vertical expansion and is performed via an output coupler. However, as used herein, horizontal and vertical are, in a sense, arbitrarily used and are not meant to be limiting in and of themselves, rather they are used to establish a common reference direction when explaining concepts (e.g., dual-axis expansion).

In some embodiments, embodiments herein may be advantageously utilized in waveguides for helmet mounted displays, head mounted displays (HMDs), and/or head up displays (HUDs) for many applications, including military applications and consumer applications (e.g., augmented reality glasses, aircraft pilot related systems, etc.). In some embodiments, the cost of the waveguide is lower than other methods by being simpler, easier to align the gratings, and/or needing fewer parts allowing for a smaller waveguide size.

Referring to FIG. 1A, a conceptual diagram of an optical display 100 including a waveguide 102 is disclosed according to one or more embodiments. In embodiments, the waveguide 102 includes couplers and gratings. Note that, in some examples, a coupler may be a type of grating. In some embodiments, the waveguide 102 includes an input coupler 104, beamsplitter 108, first expansion grating 110, second expansion grating 112, and/or output coupler 106.

Generally, one or more of the couplers and/or gratings herein may be, but are not limited to be, diffraction gratings configured to selectively diffract the image light 200 (i.e., portions of the image light 200) in one or more directions. For example, in some embodiments, gratings of the expansion gratings 110, 112 and the couplers 104, 106 are transmissive diffraction gratings.

It should be noted that a coupler (e.g., input coupler 104, output coupler 106) may, in some embodiments, couple image light 200 to and/or from the waveguide 102. For example, the input coupler 104 may allow for light to enter the waveguide 102 and be directed to portions of the waveguide 102 where total internal reflection (TIR) occurs. In this regard, the image light 200 may at least temporarily be contained within the waveguide 102. The output coupler 106, in some embodiments, allows the image light 200 to leave the waveguide 102 (i.e., to break TIR).

In embodiments, the optical display 100 includes an image source 10. The image source 10 may be configured to generate image light 200 (e.g., image light 200a).

In embodiments, the optical display 100 includes collimating optics 20 configured to collimate the image light 200 from the image source 10. In some examples, the image light 200 is already collimated before entering the waveguide 102. In some embodiments, the image light 200 from the image source 10 is polarized. For example, the optical display 100 may include a polarization filter configured to polarize image light 200.

Figure 1B:
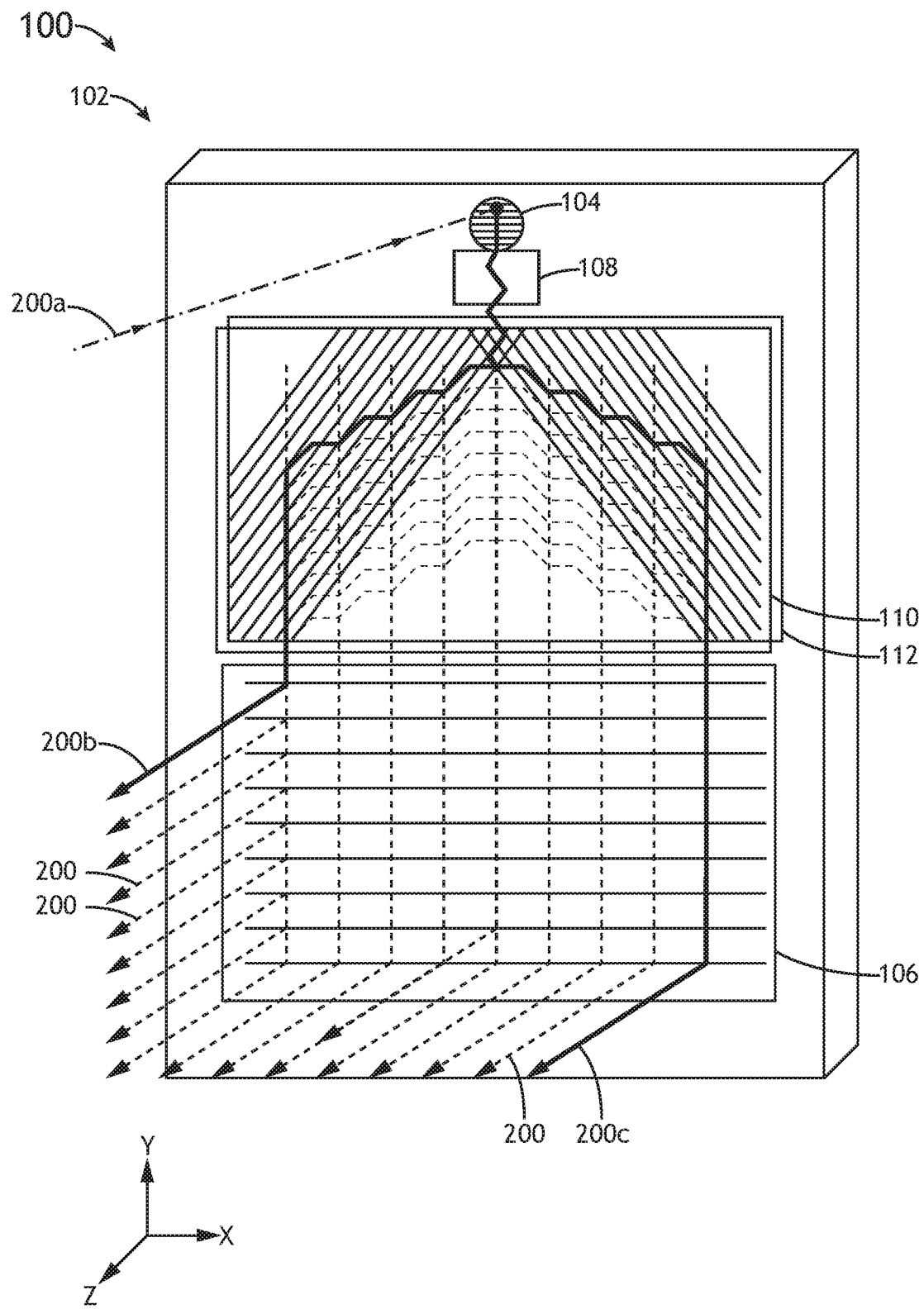
FIG. 1B is a schematic drawing of image light associated with a first expansion grating of the optical display of FIG. 1B according to an exemplary embodiment.

Referring to FIG. 1B, a schematic drawing of an optical display 100 configured for dual sided expansion is disclosed according to one or more embodiments. Note that, as shown, the optical display 100 is configured to allow for dual axis (e.g., horizontal and vertical) expansion of the eyebox as well as dual sided expansion. Note that FIGS. 1C and 1D are illustrations of the same optical display 100 as shown in FIG. 1B, but FIG. 1C is simplified to show image light 200b associated with the first expansion grating 110 and FIG. 1D is simplified to show image light 200c associated with the second expansion grating 112.

It should be noted that FIGS. 1A through 2B are not necessarily accurate, and are shown merely for nonlimiting illustrative purposes in a conceptual manner. For example, (for FIGS. 1A through 2B) the following aspects such as the dimensions; scale; positions; number of elements (e.g., number of grating lines shown); number of reflections, diffractions, and/or the like that a particular image light 200b, 200c, 200 path takes; angle of grating lines; and/or the angle of diffraction are not necessarily accurate, realistically scaled, practical, ideal, and/or the like. It should be noted that such aspects may vary in embodiments and are not meant to be limiting and may be shown in a simplified illustrative manner. For example, the number and position of reflections (and interactions with gratings) that a particular image light 200b, 200c, 200 path takes in FIG. 1E may not accurately match relative to image light 200b, 200d, 200 as shown in FIG. 1B.

Figure 1C:
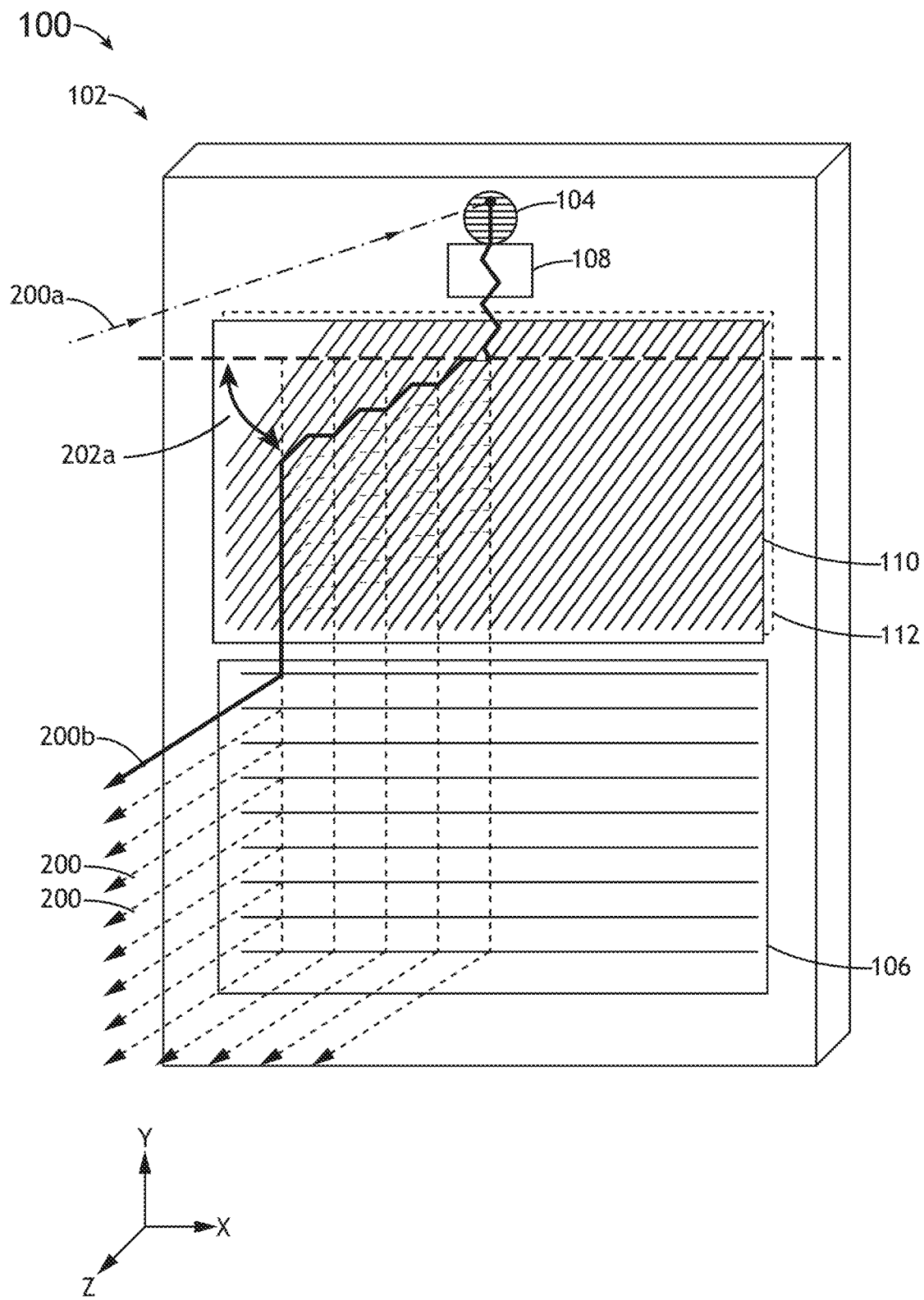
FIG. 1C is a schematic drawing of image light associated with a first expansion grating of the optical display of FIG. 1B according to an exemplary embodiment.
Figure 1D:
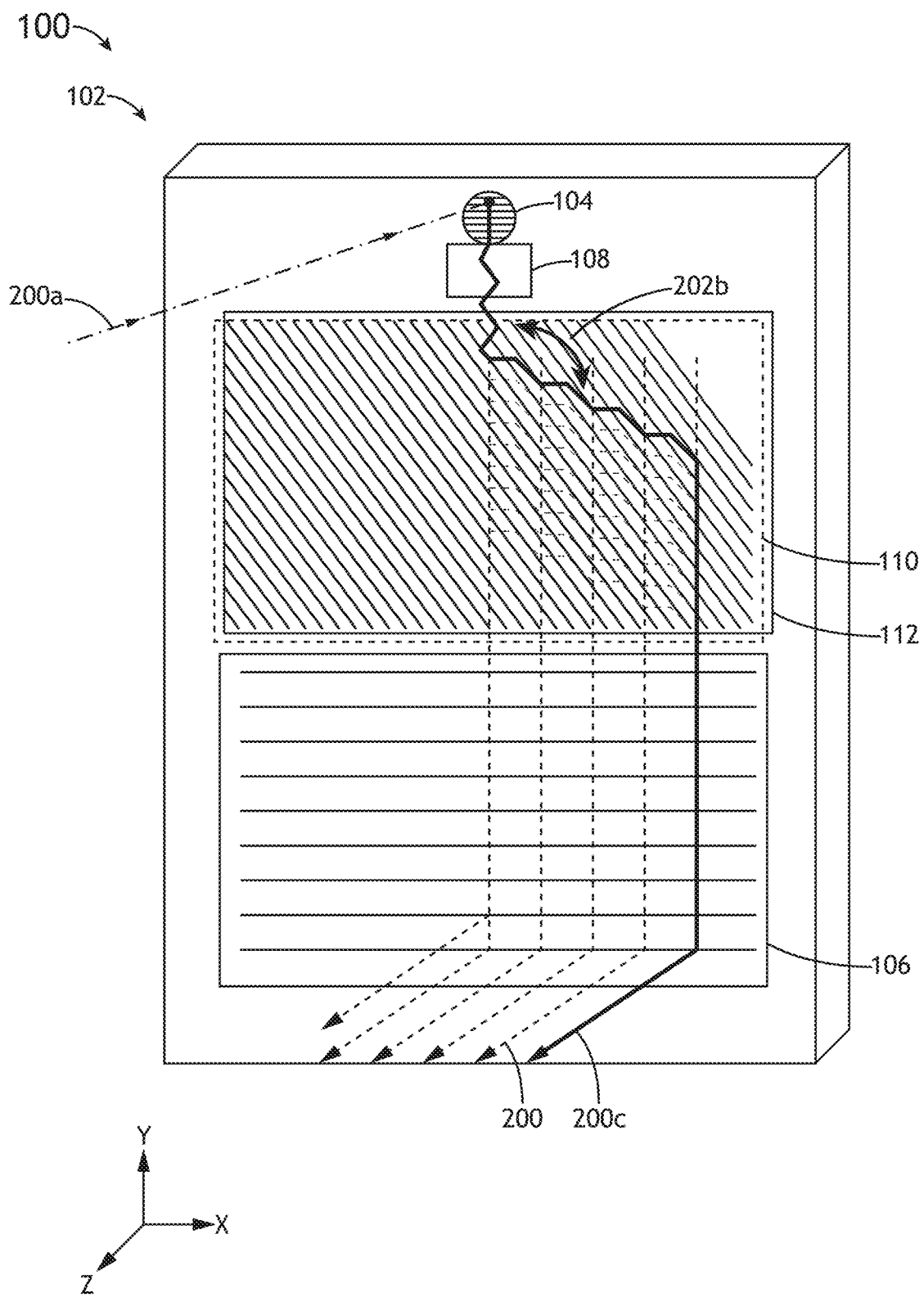
FIG. 1D is a schematic drawing of image light associated with a second expansion grating of the optical display of FIG. 1B according to an exemplary embodiment.

Note that in at least FIGS. 1C and 1D, the schematic drawings only show a limited number of image light 200b, 200c, 200 paths from the output coupler 106 for clarity and simplicity, but that the output coupler 106 may be configured to output many more image light 200 across the entire output coupler 106 than are shown. For example, the output coupler 106 may be configured to output many (e.g., hundreds of, thousands of) rows and columns (e.g., not necessarily 9 rows and 9 columns as shown) of image light 200 in a rectangular pattern or in any other pattern, shape, and/or the like. For example, other example image lights (not shown) may exit the center of the output coupler 106 taking a different path but may be cut-away from the schematic drawings for simplicity.

In embodiments, the waveguide 102 may include an input coupler 104. In some examples, the input coupler 104 may be configured to couple image light 200 (from an image source 10) into the waveguide 102 (e.g., into the beamsplitter 108 of the waveguide 102). It should be noted, in at least some embodiments, a grating period of the input coupler 104 and a grating period of the output coupler 106 are equal and that being equal may be crucial to achieve zero dispersion of image light 200.

In embodiments, the waveguide 102 may include a beamsplitter 108. In embodiments, the beamsplitter 108 is configured to split the image light 200 and direct the image light 200 to the first expansion grating 110 and the second expansion grating 112. In some examples, the beamsplitter 108 is configured to split the image light 200 thereby filling the waveguide with light so that there are no gaps.

In embodiments, the waveguide 102 may include dual-sided expansion gratings 110, 112. For example, a first expansion grating 110 may at least partially overlap a second expansion grating 112, as shown. For instance, the first expansion grating 110 may face/oppose the second expansion grating 112. Because, in at least some embodiments, no light is extracted from the waveguide within the expansion section (i.e., TIR occurs in that section) associated with expansion waveguides 110, 112, this configuration leads to a more efficient (brighter) display. In this regard, the expansion gratings 110, 112 may more efficiently expand the image light 200 along a direction (e.g., horizontally along an X-direction) compared to the efficiency of other methods (e.g., methods using a "mushroom forest").

Referring to FIG. 1C, a schematic drawing of an example image light 200b that is associated with the first expansion grating 110 of the optical display of FIG. 1B is disclosed according to one or more embodiments. Referring to FIG. 1D, a schematic drawing of a different example image light 200c associated with the second expansion grating 112 of the optical display of FIG. 1B is disclosed according to one or more embodiments.

In some embodiments, the image light 200 shown (e.g., input image light 200a, example image light 200c, and different example image light 200) may be, in a sense, illustrated as a path of a single light beam (e.g., single pixel) of an image to be displayed by the optical display 100. In this regard, as shown, a single pixel may be expanded in a horizontal and vertical direction such that the area in front of the waveguide 102 from which the image to be displayed is properly viewable (i.e., the eyebox) is expanded in two directions.

As shown, the expansion gratings 110, 112 expand the image light 200 along the X-axis but an angle of expansion of a path of the image light 200 for such expansions is not necessarily parallel to the X-axis (e.g., see the roughly 45-degree angle of expansion relative to the X-axis of the path of image light 200b in FIG. 1C within the first expansion grating 110). For example, as shown in FIGS. 1C and 1D, image light 200 may be expanded at angles of expansion 202a-b that are towards the X-direction (e.g., towards the right side) and/or away from the X-direction (e.g., towards the left side), but not parallel with the X-axis. For instance, image light 200 may be expanded at any angle relative to the X-direction. Such directions, if measured from the Y-direction, on either side of the Y-axis, may be between 0.1 and 180 degrees, such as 125 degrees, 135 degrees, between positive and/or negative 90.1 to 180 degrees (e.g., angled downwards as shown), and the like. In some instances, such angles of expansion may be referred to as a first angle of expansion 202a and a second angle of expansion 202b. In some examples, the first angle of expansion 202a associated with the first expansion grating 110 and the second angle of expansion 202b associated with the second expansion grating 112 are symmetric about an axis/direction (e.g., the Y-direction) as shown, but such a configuration is not required.

Moreover, it should be noted that embodiments of the present disclosure allow for nonsymmetric angles of expansion (associated with nonsymmetrical grating angles) of the expansion gratings 110, 112 because the expansion gratings 110, 112 may be self-reciprocal and completely independent of each other (rather than being dependent such as the couplers may be). For example, the grating period and angle relative to the Y-direction of each expansion grating 110, 112 may be different than each other (e.g., nonsymmetrical). For example, although shown as symmetrical to the grating lines of the first expansion grating 110, the grating lines of the second expansion grating 112 may be at a different (nonsymmetrical) angle relative to the Y-direction such that the first angle of expansion is non-symmetrical relative to the second angle of expansion. Note that grating lines may be illustrative of the general alignment and direction of gratings in the X-Y plane for some embodiments.

Further, a grating period of the first expansion grating 110 may be different than a grating period of the second expansion grating 112.

In embodiments, in order to both expand the image light 200 along the first axis (e.g., X-axis) and also direct the image light 200 in a second direction (e.g., in the negative Y-direction, downwards), the expansion gratings 110, 112 include one or more diffraction gratings. In this regard, the expansion gratings 110, 112 may be used to shift portions of the image light 200 along the first axis (e.g., horizontally) in such a way that the original direction of the image light 200 when entering the expansion gratings 110, 112 is maintained. Further, in embodiments as shown in FIG. 1C, the same gratings lines (e.g., diagonal lines) shown that expand the image light 200b along the first axis (e.g., at the first angle of expansion; towards the lower left) are the same gratings (e.g., same type of grating of the same grating pattern having the same grating period, and/or the like) that direct that image light 200b towards the second direction (e.g., downwards). In this regard, a single expansion grating may be configured to both expand the image light along a first axis and direct the image towards a second axis using the same grating pattern.

In embodiments, as shown in FIG. 1C the first expansion grating 110 is configured to receive the image light 200 (e.g., of which a portion is example image light 200b) from the beamsplitter 108. In embodiments, the first expansion grating 110 is further configured to expand the image light 200 along a first axis (e.g., X-axis) and away from a first direction (e.g., away from the X-direction pointing to the right) at a first angle of expansion (e.g., 45 degrees below the X-axis). In embodiments, the first expansion grating 110 is further configured to direct the image light 200 in a second direction (e.g., downwards, negative Y-direction) different than the first direction.

In embodiments, the second expansion grating 112 may function similar to the first expansion grating 110, but, in a sense, mirrored (but not necessarily symmetrically mirrored) to expand the image light 200 to an opposite side (e.g., the right side) along the same axis. For example, in embodiments, as shown in FIG. 1D the second expansion grating 112 is configured to receive the image light 200 (e.g., of which a portion is example image light 200c) from the beamsplitter 108. In embodiments, the second expansion grating 112 is further configured to expand the image light 200 along a first axis (e.g., X-axis) and towards the first direction (e.g., X-direction pointing to the right) at a second angle of expansion (e.g., 45 degrees below the X-axis). In embodiments, the second expansion grating 112 is further configured to direct the image light 200 in the second direction (e.g., downwards, negative Y-direction).

In embodiments, as shown in FIGS. 1C-1D the output coupler 106 is configured to receive the image light 200 from the first expansion grating 110 and the second expansion grating 112. In embodiments, the output coupler 106 is further configured to expand the image light 200 along a second axis (e.g., a vertical axis, Y-axis, and/or the like) parallel to the second direction. In embodiments, the output coupler 106 is further configured to cause the image light 200 to exit the waveguide 102 in an output direction (e.g., but not limited to, a Z-direction; within 5 or 10 degrees from the Z-direction; and/or the like).

Figure 1E:
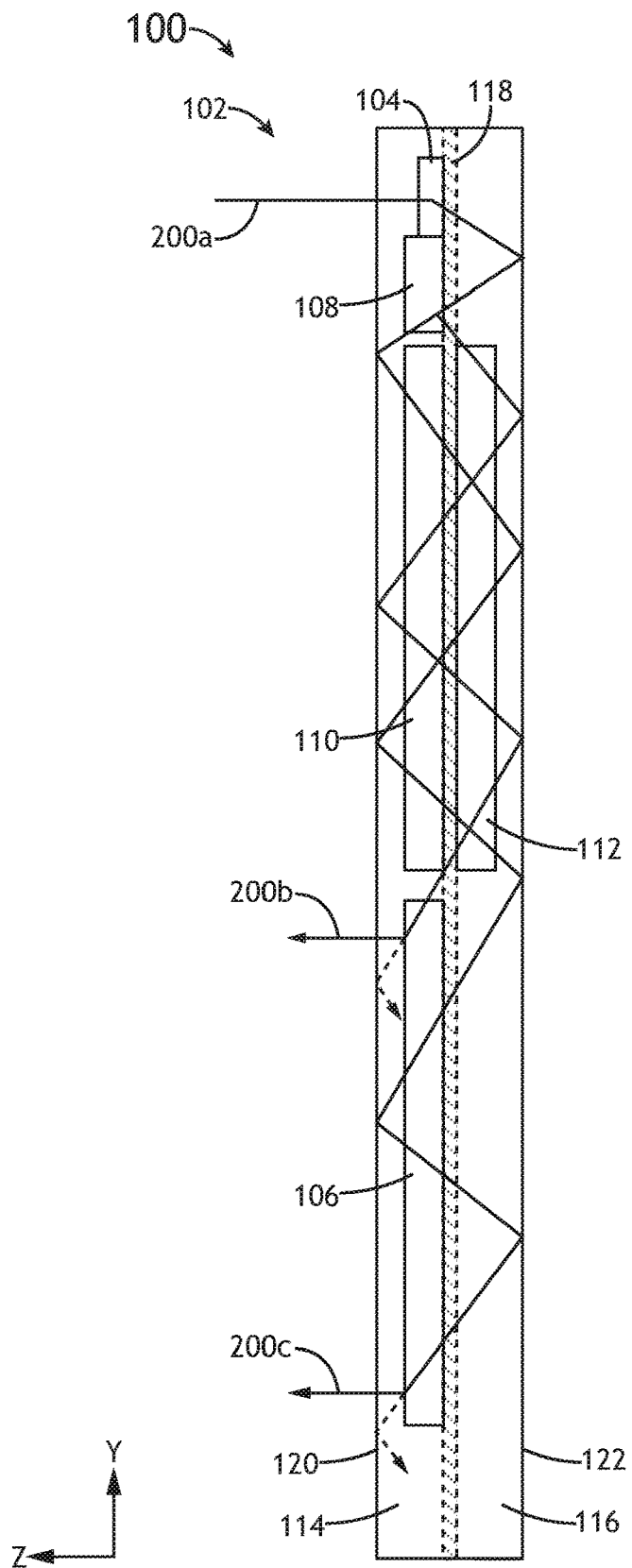
FIG. 1E is a planar side view schematic drawing of an optical display in a dual layer configuration according to an exemplary embodiment.
Figure 2A:
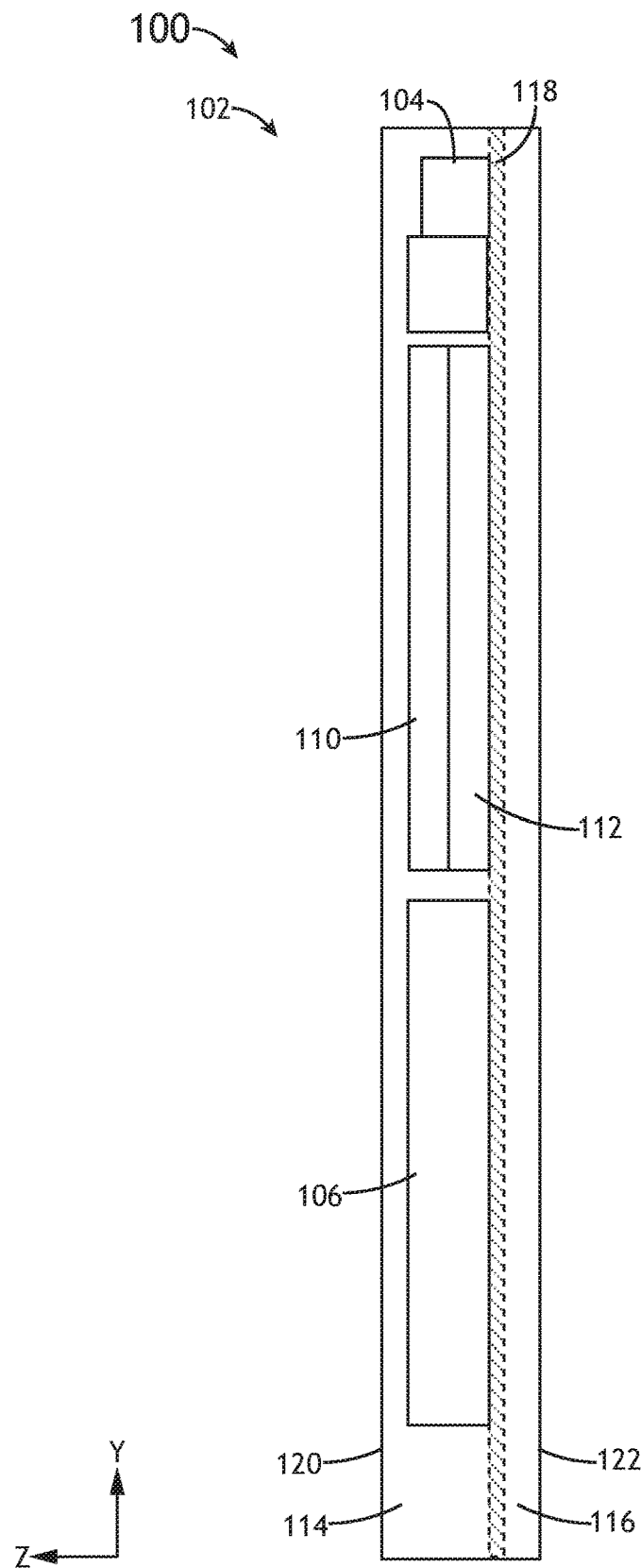
FIG. 2A is a planar side view schematic drawing of an optical display in an alternate dual layer configuration according to an exemplary embodiment.
Figure 2B:
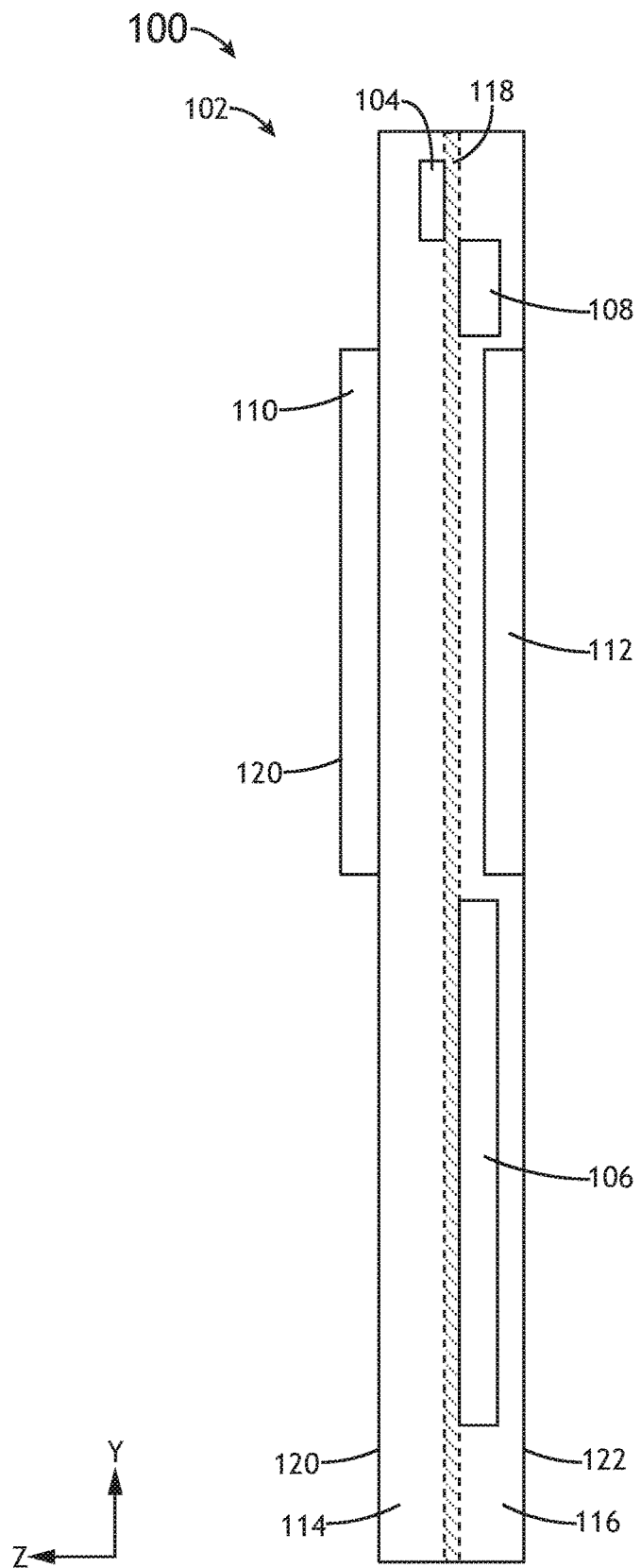
FIG. 2B is a planar side view schematic drawing of an optical display in an alternate multi-layer configuration according to an exemplary embodiment.

Referring to FIGS. 1E, 2A, and 2B, planar side views of schematic drawings of example optical displays 100 in multi-layer configurations are disclosed according to example embodiments. In some examples, the optical displays 100 shown in FIGS. 1E, 2A, and 2B are the same optical display 100 as is shown in FIGS. 1B through 1D.

In embodiments, the waveguide 102 includes one or more layers (e.g., substrates) and/or coatings (e.g., reflective coatings, protective coatings, adhesives, and the like). For example, the waveguide 102 may be one or more substrates. In some examples, the waveguide 102 is an optically transmissive material, such as glass or plastic suitable for optical designs.

In embodiments, as shown, the waveguide 102 may include a first layer 114 and a second layer 116. In some embodiments, the waveguide 102 includes a first surface 120 and a second surface 122. In some examples, but not necessarily all examples, the first surface 120 is an outer surface of the first layer 114 and the second surface 122 is an outer surface of the second layer 116 as shown in FIGS. 1E and 2A. In other examples, the first surface 120 may, as shown in FIG. 2B, for at least a portion of the waveguide 102, extend out on an outer surface of another substrate layer (e.g., first expansion grating 110 layer as labeled in FIG. 2B). Note that the examples shown in FIGS. 1E, 2A, and 2B are nonlimiting and any number of layers with couplers, gratings on any number of surfaces may be utilized. For example, the beamsplitter 108 may be in the second layer 116, the output coupler 106 may be at or near a surface (e.g., first surface 120), and/or any other variation of surfaces, layers, and locations of elements may be utilized herein.

In embodiments, the first layer 114 and the second layer 116 are coupled together via at least one of a lamination or an adhesive 118 as shown. The adhesive may be optically transmissive to match a refractive index of other layers (e.g., layers 114, 116).

Referring to FIG. 1E, in embodiments, the first layer 114 comprises the input coupler 104, the beamsplitter 108, the first expansion grating 110, and/or the output coupler 106.

Referring to FIG. 2A, in embodiments, the first expansion grating 110 and the second expansion grating 112 may be in the same layer (e.g., first layer 114). For example, the first expansion grating 110 may be adjacent to and/or coupled to the second expansion grating 112 (e.g., but not limited to, being deposited and/or etched in overlapping layers using any substrate manufacturing process).

Referring to FIG. 2B, in embodiments, the first expansion grating 110 may be located in a layer outside the first layer 114 and the second layer 116 as shown. Similarly, any other element may be at or near one or more surfaces (e.g., inside or outside surface) of one or more layers wherein such layers are outside the first layer 114 and the second layer 116.

Referring back to FIG. 1A, one or more embodiments are discussed below.

As used throughout the present disclosure, terms such as "image light", "image light 200", "light", "image", and the like may mean "portions of" such terms and be shortened for purposes of brevity and reducing complexity of sentences. For example, the phrase "the first expansion grating configured to receive the image light" may mean "the first expansion grating configured to receive a portion of the image light". For example, beamsplitters, couplers, gratings and the like herein may be used to diffract, split, direct, and/or the like the image light 200 (e.g., portions of image light 200) into smaller and smaller portions (e.g., subsets of a plurality of portions; subsets of subsets) when expanding the image light 200 along two axes. Further, "image light" and the like may mean a single pixel of image light and/or the entire image (all pixels).

In embodiments, the optical display 100 is an HUD and/or configured to be used with an HUD.

In embodiments, the optical display 100 is an HMD and/or configured to be used with an HMD.

In embodiments, the optical display 100 is a helmet mounted display and/or configured to be used with a helmet mounted display.

In embodiments, the input coupler 104 can be a prism, mirror, reflective surface, or grating for injecting light from the image source 10 into the waveguide 102. In some embodiments, the input coupler 104 can be a replicated grating or a holographic grating. Similarly, and in some embodiments, the expansion gratings 110, 112 and the output coupler 106 can be replicated or holographic gratings. As used herein, the term grating may encompass a grating comprised of a set of gratings in some embodiments.

In some embodiments, the waveguide 102 is comprised of a number of pieces including the input coupler 104, the expansion gratings 110, 112 and the output coupler 106 (or portions thereof) that are laminated together to form a single substrate waveguide. For example, the pieces may be separated by optical glue or other transparent material of refractive index matching that of the pieces.

In another embodiment, the input coupler 104, the expansion gratings 110, 112 and the output coupler 106 can each be recorded, etched, deposited, replicated, and/or the like into the same layer (e.g., substrate) to form the waveguide 102.

It should be noted that in some embodiments, by using the expansion gratings 110, 112, image light 200 can travel by total internal reflection (TIR) within the waveguide 102 in a single rectangular prism defined by a first surface 120 and a second surface 122 while achieving dual axil pupil expansion and dual sided expansion.

In some examples, the image source 10 includes a microdisplay and/or a laser-based display. In one or more embodiments, the image source 10 includes a liquid crystal display (LCD) micro display or liquid crystal on silicon (LCOS) micro display. In some embodiments, the input objective lenses may be many different types of lenses, including, for example, projection lenses. In some embodiments, however, the image source 10 includes a single input objective lens.

In some examples, the image source 10 includes a number of input objective lenses (not shown) of the collimating optics 20. In some embodiments, input objective lenses collimate the image light 200a and each pixel of an image to be produced (e.g., of which the image light 200 shown may be but a single pixel for simplicity of illustration) is converted into a unique angular direction within the waveguide 102. The input coupler 104 may be orientated directly towards or at an angle relative to the expansion gratings 110, 112. In some embodiments, at least one of the input objective lenses may be a diffractive lens.

In some embodiments, the expansion gratings 110, 112 are oriented in a diagonal direction as shown in FIGS. 1B-1D.

In some embodiments, the output coupler 106 may consist of multiple layers of substrate, thereby comprising multiple layers of output gratings of an output coupler 106. Accordingly, there is no requirement for gratings to be in one plane within the waveguide 102, and gratings may be stacked on top of each other (e.g., cells of gratings stacked on top of each other) or on (or within) any surface of one or more layers of the waveguide 102.

It should also be noted that in the present disclosure, repeated usage of the phrase "in one embodiment", "in embodiments", and the like does not necessarily refer to the same embodiment.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An optical display comprising:
   a waveguide;
   an input coupler in the waveguide, the input coupler configured to couple image light from an image source into a beamsplitter;
   the beamsplitter configured to split the image light into a reflective beam and a transmissive beam and direct the transmissive beam and reflective beam to a first expansion grating and a second expansion grating;
   the first expansion grating configured to receive the transmissive beam and reflective beam from the beamsplitter, expand the transmissive beam and reflective beam along a first axis and away from a first direction at a first angle of expansion, and direct the transmissive beam and reflective beam out of the first expansion grating in a second direction different than the first direction;
   the second expansion grating configured to receive the transmissive beam and reflective beam from the beamsplitter, to expand the transmissive beam and reflective beam along the first axis and towards the first direction at a second angle of expansion, and direct the transmissive beam and reflective beam out of the first expansion grating in the second direction;
   an output coupler configured to:
      receive the transmissive beam and reflective beam from the first expansion grating and the second expansion grating,
      expand the transmissive beam and reflective beam along a second axis parallel to the second direction, and
      cause the image light to exit the waveguide in an output direction.

2. The optical display of claim 1, wherein the first expansion grating at least partially overlaps the second expansion grating.

3. The optical display of claim 2, wherein a grating period of the first expansion grating is different than a grating period of the second expansion grating.

4. The optical display of claim 2, wherein the first axis is horizontal, and the second axis is vertical.

5. The optical display of claim 2, wherein the first axis is vertical, and the second axis is horizontal.

6. The optical display of claim 1, wherein the first angle of expansion and the second angle of expansion are non-parallel with the first axis and the second axis.

7. The optical display of claim 1, wherein the first angle of expansion is asymmetrical about the second axis relative to the second angle of expansion.

8. The optical display of claim 1, wherein a first layer comprises the input coupler and the first expansion grating.

9. The optical display of claim 1, wherein a first layer comprises the beamsplitter, the second expansion grating, and the output coupler.

10. A method of displaying image light comprising:
receiving collimated image light from an image source in an input coupler of a waveguide;
providing the image light to a beamsplitter via total internal reflection;
providing a reflective beam and a transmissive beam to a first expansion grating and a second expansion grating;
expanding the reflective beam or the transmissive beam along a first axis away from a first direction at a first angle of expansion using the first expansion grating, and directing the image light out of the first expansion grating in a second direction to an output coupler via total internal reflection, wherein the second direction is different than the first direction;
expanding the reflective beam or the transmissive beam along the first axis towards the first direction at a second angle of expansion using the second expansion grating, and directing the image light out of the second expansion grating in the second direction to the output coupler via total internal reflection;
expanding the reflective beam or the transmissive beam along a second axis using the output coupler; and
causing the reflective beam and the transmissive beam to exit the waveguide in an output direction.

11. The method of claim 10, wherein the first expansion grating at least partially overlaps the second expansion grating.

12. The method of claim 11, wherein a grating period of the first expansion grating is different than a grating period of the second expansion grating.

13. The method of claim 11, wherein the first axis is horizontal, and the second axis is vertical.

14. The method of claim 11, wherein the first axis is vertical, and the second axis is horizontal.

15. The method of claim 10, wherein the first angle of expansion is asymmetrical about the second axis relative to the second angle of expansion.

16. The method of claim 10, wherein the first angle of expansion and the second angle of expansion are nonparallel with the first axis and the second axis.

17. The method of claim 10, wherein the waveguide comprises two or more layers, the two or more layers comprising a first layer and a second layer.

18. The method of claim 17, wherein the first layer and the second layer are coupled together via at least one of lamination or adhesive.

19. The method of claim 17, wherein the first layer comprises the input coupler and the first expansion grating.

20. The method of claim 19, wherein the first layer further comprises the beamsplitter, the second expansion grating, and the output coupler.

* * * * *